(12) United States Patent
Rogerson et al.

(10) Patent No.: US 6,508,113 B1
(45) Date of Patent: Jan. 21, 2003

(54) METHOD OF MANUFACTURING OPTICAL FIBER

(75) Inventors: John William Rogerson, Harlow (GB); Paul Alexander Davies, Stansted Mountfitchet (GB); John Alfred Hadley, Harlow (GB)

(73) Assignee: Pirelli General plc, London (GB)

( * ) Notice: Subject to any disclaimer, the term of this patent is extended or adjusted under 35 U.S.C. 154(b) by 0 days.

(21) Appl. No.: 09/348,318

(22) Filed: Jul. 7, 1999

(30) Foreign Application Priority Data

Jul. 8, 1998 (GB) ............................................. 9814842

(51) Int. Cl.⁷ ............................................... G01L 5/04
(52) U.S. Cl. ............................................ 73/159; 73/160
(58) Field of Search .................................... 73/159, 160

(56) References Cited

U.S. PATENT DOCUMENTS

| | | |
|---|---|---|
| 4,062,501 A | 12/1977 | Eisenberg et al. |
| 4,331,463 A | 5/1982 | Briere et al. |
| 4,397,524 A | 8/1983 | Yoshimura et al. |
| 4,509,968 A | 4/1985 | Arditty et al. |
| 4,511,095 A | 4/1985 | Ideno et al. |
| 4,995,698 A * | 2/1991 | Myers ..................... 350/96.29 |

FOREIGN PATENT DOCUMENTS

| | | |
|---|---|---|
| GB | 2 044 751 A | 10/1980 |
| GB | 2 276 367 A | 9/1994 |
| GB | 2 305 663 A | 4/1997 |
| JP | 64-69537 | 3/1989 |

OTHER PUBLICATIONS

Mabee, III, deceased, et al. U.S. Statutory Invention Registration No. H502 "High Speed Precision Optical Fiber Winding System" (Aug. 2, 1998).*
K. Kazuharu, "Method for Treating Initially Wound Part of Wiry Material in Drawing Machine" Patent Abstracts of Japan of JP 01 069537 (Mar 15, 1989).
K. Kazuharu, "Method for Treating Initially Wound Part of Wiry Material in Drawing Machine" Patent Abstracts of Japan of JP 01 069536 (Mar 15, 1989).
T. Kazuhiko, "Winding Method and Automatic Winding Device for Wire Rod" Patent Abstracts of Japan of JP 63 112376 (May 17, 1988).
F. Yoji, "Optical Fiber Winding Device" Patent Abtracts of Japan of JP 63 170238 (Jul. 14, 1988).

* cited by examiner

Primary Examiner—Hezron Williams
Assistant Examiner—Rodney T Frank
(74) Attorney, Agent, or Firm—Finnegan, Henderson, Farabow, Garrett & Dunner, L.L.P.

(57) ABSTRACT

A take up apparatus 10 for drawn optical fiber comprises: a take-up stand 22 supporting a first, storage bobbin 12 about a first axis 20; a motor 32 for rotating this first bobbin about that axis; a supporting means 36 supporting a second, sampler bobbin 14 about a second, different axis 34; a second motor 38 for rotating this second bobbin about the second axis; and means for controlling the relative rates of rotation provided by the motors. In use drawn fiber is guided about the first bobbin to the second bobbin and the bobbins are rotated to wind the fiber about the first bobbin and onto the second bobbin during initial drawing of the fiber. Subsequently the fiber between the bobbins is cut and the drawn fiber is wound onto the first bobbin.

11 Claims, 2 Drawing Sheets

METHOD OF MANUFACTURING OPTICAL FIBER

Figure 1:
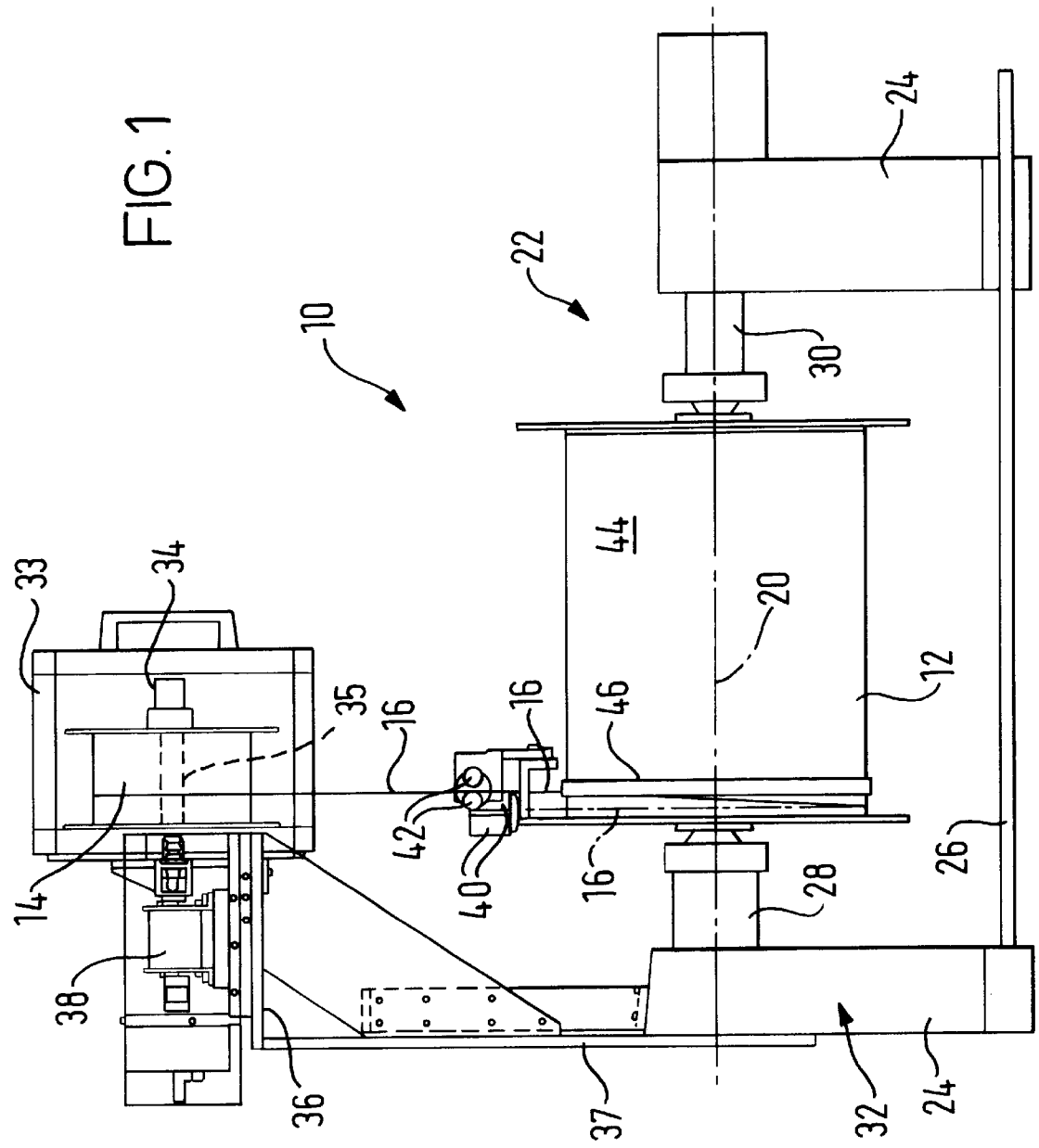

This invention relates generally to producing optical fiber.

A conventional method of producing optical fiber comprises the following steps: drawing the fiber from a heated end of a preform, cooling the fiber, applying one or more polymeric coatings to the fiber and winding the coated fiber onto a storage bobbin. Fiber and coating diameters and drawing tensions are controlled during such a method.

During the start of the process contaminants may enter the coating system and this may not be detected until after the bobbin has been filled, leading to considerable waste.

In order to avoid this problem in the present invention rather than wind the fiber directly onto the storage bobbin it is initially wound about the storage bobbin and onto another bobbin. When desired drawing conditions are reached, the fiber is cut between the bobbins and the drawn fiber is wound onto the storage bobbin. The fiber wound onto the other bobbin may then be tested whilst drawing continues. If the test results are unsatisfactorily appropriate remedial action may be taken.

The invention provides take-up apparatus for drawn optical fiber comprising:

first supporting means for supporting a first bobbin about a first axis; first rotating means for rotating such a first bobbin, when supported by said first supporting means, about said first axis; second supporting means for supporting a second bobbin about a second, different axis; second rotating means for rotating such a second bobbin, when supported by said second supporting means, about said second axis; guide means for guiding a drawn optical fiber about a first bobbin when supported by said first supporting means and to a second bobbin when supported by said second supporting means; means for controlling the relative rates of rotation provided by the first and second rotating means; and means for causing drawn fiber attached at a leading end thereof to a first bobbin when supported by said first supporting means and rotated by said first rotating means to be wound onto such a bobbin in a plurality of layers.

The invention also includes an optical fiber production line having apparatus as defined in the last preceding paragraph.

The invention also includes apparatus as defined in the last but one preceding paragraph having a said first bobbin supported by said first supporting means and a said second bobbin supported by said second supporting means. Advantageously, the first bobbin is of greater capacity than said second bobbin.

Preferably the first and second axes are substantially parallel.

The first supporting means may be adapted to reciprocate a first bobbin, when supported thereby, along said first axis. In this case, typically the supporting means comprises a member slidably mounted for reciprocating movement along said first axis.

The second supporting means may be adapted to reciprocate a second bobbin, when supported thereby, along said second axis. In this case preferably the second support means comprises a support fixedly mounted to said member for reciprocating movement therewith.

Advantageously the support is located above said first supporting means.

The invention also includes a method of drawing optical fiber including guiding the drawn fiber about a first bobbin to a second bobbin, rotating said bobbins to wind the fiber about the first bobbin and onto the second bobbin during initial drawing of the fiber, and subsequently cutting the fiber between the bobbins and winding the drawn fiber onto the first bobbin.

The method may include testing fiber wound onto the second bobbin whilst winding fiber onto the first bobbin.

The method may include controlling the tension of the fiber between the first and second bobbins during the step of winding the fiber about the first bobbin and onto the second bobbin by controlling the relative rates of rotation of said bobbins.

The method preferably includes after the cutting step, adhering the upstream cut end of fiber to the surface of a hub of the first bobbin. In this regard the method may include providing a double-sided adhesive tape about the hub of the first bobbin and adhering the upstream cut end of the fiber to the tape. Alternatively, the method may include providing a tape which is adhesive on one side only, adhesive side out about the hub of the first bobbin and adhered to itself, and adhering the upstream cut end of the fiber to the tape.

Figure 2:
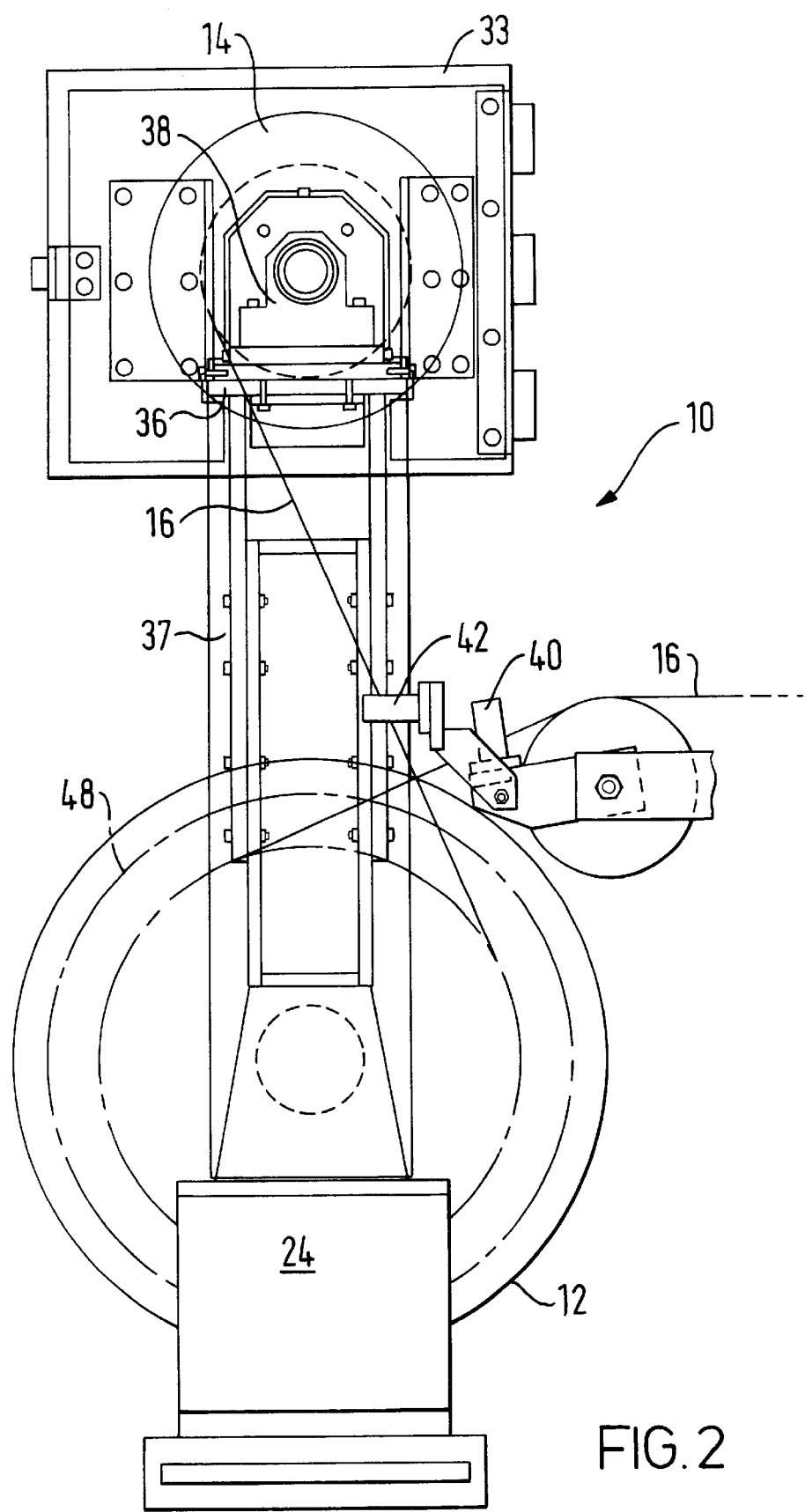

In order that the invention may be well understood, an embodiment thereof which is given by way of example only, will now be described with reference to the accompanying drawings, in which:

FIG. 1 is a front elevation of a take-up apparatus for drawn optical fiber in use during a start-up procedure of the drawing process; and FIG. 2 is a side elevation of the same apparatus.

In the Figures, a take-up apparatus 10 for drawn optical fiber is shown with a first, or storage, bobbin, or spool, 12 and a second, or sampler, bobbin, or spool, 14 fitted thereto and an optical fiber 16 which has been provided with at least one polymeric coating upstream of the apparatus 10 guided over a roller 18, about bobbin 12 to bobbin 14.

The storage bobbin 12 is supported for rotation about an axis 20 by a support means 22 which comprises a conventional take-up stand. The take-up stand includes side members 24 mounted for reciprocating moving along the axis 20 on a track 26. Spindles 28 and 30 extending towards each other from the side members 24 support the bobbin 12 for rotation about axis 20. A motor at location 32 rotates spindle 30 to cause the bobbin 12 to rotate.

The sampler bobbin 14 is supported within a guard 33 for rotation about an axis 34, which is parallel to axis 20, on a spindle 35 by a supporting means. This supporting means includes a support 36 fixedly mounted by an upright 37 to the side member 24 from which the spindle 28 extends. A motor 38 mounted on support 36 is provided for rotating the spindle 35 and thus the bobbin 14.

The relative rotation of the spindles 30 and 35 and thus the bobbins 12 and 14 is controlled by an electronic control circuit (not shown) so that the tension of the fiber between the bobbins 12 and 14 is maintained between predetermined limits. In this connection it has been established that if the fiber tension at this location is too low, problems may occur in the control of the draw rate of the fiber and if the fiber tension is too high, fiber breakage may occur.

As illustrated the bobbin 14 is supported directly above the bobbin 12 thereby leading to no increase in the length or width of the optical fiber production line at the location of the take-up stand.

In use, at start-up of a fiber drawing process, drawn fiber provided with a polymeric coating is thread over roller 18 between a pair of roller guides 40 and then about bobbin 12 for less than one complete turn and through a pair of roller guides 42 to bobbin 14 to which the end of the drawn fiber is secured.

The bobbins are rotated to wind the drawn fiber onto bobbin 14. During this winding operation the side members 24 of the take-up stand are reciprocated together on track 26 over an axial distance substantially corresponding to the axial length of the belly, or hub, of the bobbin 14 which is simultaneously reciprocated over the same distance in view of the mounting of the support 36 to the side member 24. In this way fiber is wound onto the bobbin 14 in layers, whilst the path of the optical fiber is substantially maintained.

The capacity of the sampler bobbin 14 is considerably less than the capacity of the storage bobbin 12 since it only needs to accommodate fiber drawn during the initial start-up procedure in a fiber drawing process. When the required drawing conditions are reached (typically after about 8 km of fiber been drawn) the fiber is cut between the bobbins 12 and 14 and the subsequently drawn fiber is wound onto the storage bobbin 12.

In order to cause the fiber to wind onto the rotating storage bobbin 12, the upstream cut end, ie the leading end, of the fiber is fixed to the surface of a hub 44 of the bobbin 12. This is advantageously achieved by adhering this cut end to the surface of the hub. Specifically in the embodiment a length of double-sided adhesive tape 46 is provided about the hub 44. One side of the tape adheres the tape to the hub and the fiber cut end is adhered to the other, radially outwardly facing side. In the embodiment, the tape extends 360° about the hub and is about 2 inches (50.8 mm) wide. Just before the fiber is cut between the bobbins the positions of the same are such that the fiber may be cut over the tape so that the fiber wraps around the storage bobbin hub 44 and the cut end is not free to flail and damage the subsequent windings on the hub 44.

Alternatively a tape with adhesive on one side only may be used—adhesive side out and adhered to itself.

In either case the fiber may be wound onto the bobbin over an axial extent of the hub which excludes the tape so that the cut end will not damage the fiber being wound onto the storage bobbin if it separates from the adhesive tape.

During the winding of the fiber onto the storage bobbin, the side members 24 of the take-up stand are reciprocated on track 26 over an axial distance substantially corresponding to the axial length of the hub 44 of the storage bobbin 12 until a predetermined amount of fiber is wound onto the hub, as indicated by chain-dotted line 48 or until the drawing of fiber from the preform is complete. As will be understood, reciprocation of the take-up stand as described above causes the drawn fiber attached at a leading end thereof to the storage bobbin 12 supported by the take-up stand and rotated by the motor at location 32 to be wound onto the bobbin 12 in a plurality of layers.

Whilst the fiber is being wound onto the storage bobbin 12 the fiber wound onto the sampler bobbin is tested. If the test results are unsatisfactory, appropriate remedial action may be taken. In particular, if an uncorrectable defect is detected the fiber drawing process can be halted. As will be readily understood, this is preferable to carrying out tests after winding onto the storage bobbin has been completed.

What is claim is:

1. A method of manufacturing optical fiber, comprising steps of:
    drawing the fiber from a preform;
    guiding the drawn fiber at least partially around a first bobbin;
    guiding the drawn fiber on a second bobbin;
    accumulating at least some drawn fiber on the second bobbin;
    separating the at least some drawn fiber on the second bobbin from the drawn fiber that has been guided at least partially around the first bobbin, but not on the second bobbin; and
    accumulating drawn fiber on the first bobbin.

2. The method of claim 1, wherein at least a portion of the drawn fiber accumulated on the second bobbin is subjected to one or more tests prior to completion of the step of accumulating drawn fiber on the first bobbin.

3. The method of claim 1, wherein one or more samples of the at least some drawn fiber accumulated on the second bobbin are removed from the second bobbin for testing, and
    wherein one or more tests are conducted on at least one of the one or more samples prior to completion of the step of accumulating drawn fiber on the first bobbin.

4. A method of manufacturing optical fiber, comprising steps of:
    drawing the fiber from a preform;
    guiding the drawn fiber at least partially around a first bobbin;
    guiding the drawn fiber on a second bobbin;
    rotating the first bobbin and the second bobbin to accumulate at least some drawn fiber on the second bobbin;
    separating the at least some drawn fiber on the second bobbin from the drawn fiber that has been guided at least partially around the first bobbin but not on the second bobbin; and
    rotating the first bobbin to accumulate drawn fiber on the first bobbin.

5. The method of claim 4, wherein at least a portion of the drawn fiber accumulated on the second bobbin is subjected to one or more tests prior to completion of the step of accumulating drawn fiber on the first bobbin.

6. The method of claim 4, wherein one or more samples of the drawn fiber accumulated on the second bobbin are removed from the second bobbin for testing, and
    wherein one or more tests are conducted on at least one of the one or more samples prior to completion of the step of accumulating drawn fiber on the first bobbin.

7. The method of claim 4, wherein, during the step of rotating the first bobbin and the second bobbin to accumulate at least some drawn fiber on the second bobbin, a tension of the drawn fiber between the first and second bobbins is controlled by controlling relative rates of rotation of the first and second bobbins.

8. A method of manufacturing optical fiber, comprising steps of:
    drawing the fiber from a preform;
    guiding the fiber at least partially around a first bobbin and onto a second bobbin, wherein each bobbin has an axis;
    rotating the first bobbin about an axis of the first bobbin;
    rotating the second bobbin about an axis of the second bobbin;
    accumulating at least some fiber on the second bobbin, wherein the accumulation on the second bobbin results from the step of rotating the first bobbin and the step of rotating the second bobbin;
    cutting the fiber between the first bobbin and the second bobbin;
    fixing an end of the cut fiber to the first bobbin;
    rotating the first bobbin about an axis of the first bobbin;
    accumulating at least some of the fiber on the first bobbin, wherein the accumulation on the first bobbin results from the step of rotating the first bobbin about an axis of the first bobbin; and,
    wherein each step is initiated prior to the completion of the step of drawing the fiber from the preform.

9. The method of claim 8, wherein at least a portion of the fiber accumulated on the second bobbin is subjected to one or more tests prior to completion of the step of drawing the fiber from the preform.

10. The method of claim 8, wherein one or more samples of the fiber accumulated on the second bobbin are removed from the second bobbin for testing and one or more tests are conducted on at least one of the one or more samples prior to completion of the step of drawing the fiber from the preform.

11. The method of claim 4, wherein, during the step of rotating the first bobbin and the step of rotating the second bobbin to accumulate at least some drawn fiber on the second bobbin, a tension of the drawn fiber between the first and second bobbins is controlled by controlling relative rates of rotation of the first and second bobbins.

* * * * *